United States Patent [19]

Nakatani et al.

[11] 4,450,526

[45] May 22, 1984

[54] MONEY PRESET IN AN ELECTRONIC CASH REGISTER

[75] Inventors: Hiroshi Nakatani, Yamatokoriyama; Hachizou Yamamoto, Nara, both of Japan

[73] Assignee: Sharp Kabushiki Kaisha, Osaka, Japan

[21] Appl. No.: 298,626

[22] Filed: Sep. 2, 1981

[30] Foreign Application Priority Data

Sep. 5, 1980 [JP] Japan .................................. 55-123692

[51] Int. Cl.³ .......................... G06F 7/48; G06F 15/20
[52] U.S. Cl. .................................................... 364/405
[58] Field of Search ................................. 364/404, 405

[56] References Cited

U.S. PATENT DOCUMENTS

| | | | |
|---|---|---|---|
| 3,710,085 | 1/1973 | Brewer et al. | 364/404 |
| 3,748,452 | 7/1973 | Ruben | 364/405 |
| 3,946,220 | 3/1976 | Brobeck et al. | 364/405 |
| 4,144,567 | 3/1979 | Tadakuma et al. | 364/405 |

*Primary Examiner*—Charles E. Atkinson
*Attorney, Agent, or Firm*—Birch, Stewart, Kolasch & Birch

[57] ABSTRACT

An electronic cash register includes a predetermined money key for introducing desired money amount data having plural digits into the electronic cash register by a single actuation of the predetermined money amount key. A preset system is provided for assigning a desired money amount to the predetermined money amount key. The preset system includes a memory system connected to the predetermined money amount key for storing a desired numeral data of plural digits. When the predetermined money amount key is actuated in the normal registration mode, the numeral data stored in the memory system is applied to the central processor unit as an input data.

10 Claims, 1 Drawing Figure

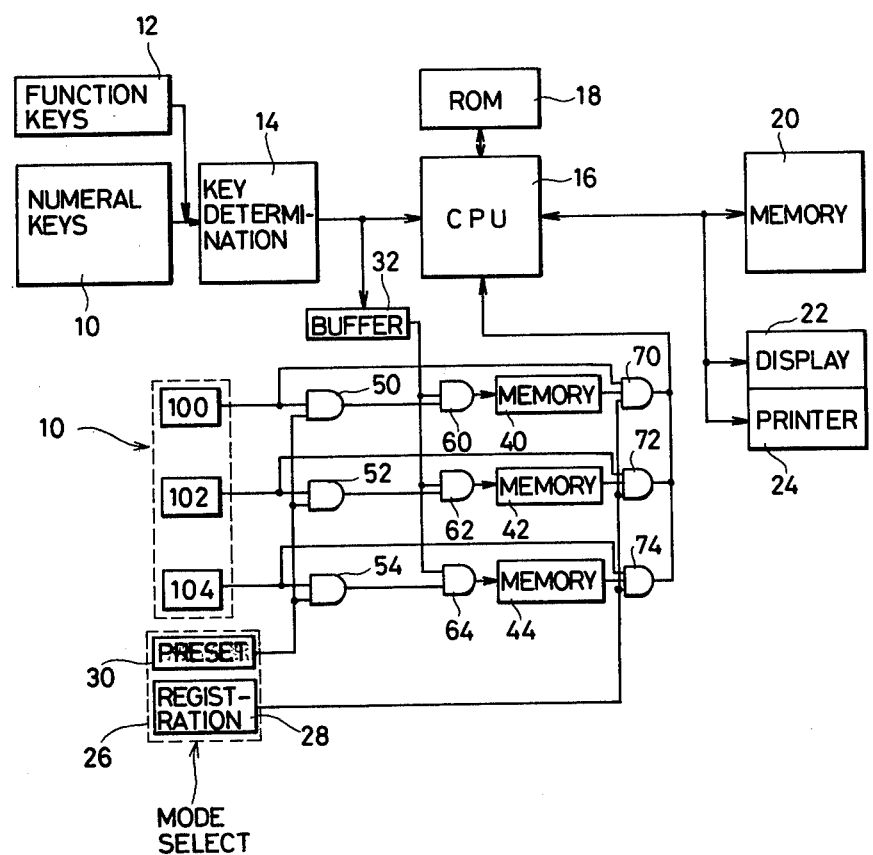

MONEY PRESET IN AN ELECTRONIC CASH REGISTER

BACKGROUND AND SUMMARY OF THE INVENTION

The present invention relates to an electronic cash register and, more particularly, to a numeral information input system in an electronic cash register.

It is useful to introduce preselected money data having plural digits into an electronic cash register when a single key is actuated. In the conventional system, there are provided on a keyboard panel a "ten thousand" key, a "five thousand" key and a "thousand" key for introducing the numeral data of "ten thousand", "five thousand" and "one thousand", respectively. However, in the conventional system, the money data is fixed. Therefore, it is necessary to vary the program construction when the cash register is desired to be exported from Japan to, for example, the United States of America and/or West Germany.

Accordingly, an object of the present invention is to provide an electronic cash register wherein money data of a preselected amount may be introduced into the electronic cash register by an actuation of a single key.

Another object of the present invention is to provide a preset system for presetting a desired amount into a memory associated with a preselected key, thereby introducing the memorized desired amount into the electronic cash register when the preselected key is actuated.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

By effectively utilizing the preset system of the present invention, a desired money value can be assigned to a preselected key included in the numeral key panel of the electronic cash register.

BRIEF DESCRIPTION OF THE DRAWING

The present invention will be better understood from the detailed description given hereinbelow and the accompanying drawing which is given by way of illustration only, and thus is not limitative of the present invention and wherein:

The single drawing FIGURE is a schematic block diagram of an essential part of an electronic cash register employing an embodiment of a money preset system of the present invention.

DESCRIPTION OF THE PREFERRED EMBODIMENTS

An electronic cash register comprises numeral keys 10, function keys 12, a key determination circuit 14 and a central processor unit 16. The central processor unit 16 performs various operations in accordance with programs stored in a read only memory 18. The operation result is applied to a main memory 20 for storing transaction data processed by the electronic cash register. The operation result obtained by the central processor unit 16 is further applied to a digital display panel 22 for display purposes, and to a printer unit 24 for printing out the transaction data onto a journal paper and/or a receipt slip.

The electronic cash register further includes a mode selection switch 26 for selectively placing the electronic cash register in a normal registration mode or a preset mode. When a registration mode key 28 is actuated, the electronic cash register is placed in the normal registration mode, wherein the transaction data is introduced into the electronic cash register through the numeral keys 10 and the function keys 12, and the thus introduced transaction data is stored in the main memory 20, displayed on the digital display panel 22, and printed on the journal paper and/or the receipt slip by the printer unit 24. When a preset mode key 30 is actuated, the electronic cash register is placed in the preset mode, wherein a specific function is preset in the electronic cash register in a desired manner.

The numeral keys 10 include preselected money amount keys 100, 102 and 104 for introducing preselected money data into the electronic cash register. Memories 40, 42 and 44 are provided for memorizing the preselected money amount data which should be transferred to the central processor unit 16 when the corresponding money keys 100, 102 and 104 are actuated.

Operation of the preselected money keys 100, 102 and 104 is as follows. First, the preset mode key 30 included in the mode selection switch 26 is actuated to place the electronic cash register in the preset mode, wherein a desired money amount is assigned to each of the money keys 100, 102 and 104. When the preset mode key 30 is actuated, AND gates 50, 52 and 54 are placed in the operative conditions. Then, the operator introduces desired money amount information, for example, "10" into a buffer memory 32 through the use of the numeral keys 10. Thereafter, if the money key 100 is actuated, the numeral data "10" is introduced into the memory 40 via an AND gate 60. In this way, the money "10" is assigned to the money key 100, and the preset data "10" is stored in the memory 40.

Similarly, when the numeral information "50" is introduced from the numeral keys 10 and the money key 102 is actuated, the numeral data "50" is introduced into the memory 42 through an AND gate 62, thereby assigning the money "50" to the money key 102. When the numeral information "100" is introduced from the numeral keys 10 and the money key 104 is actuated in the preset mode, the numeral data "100" is introduced into the memory 44 through an AND gate 64, thereby assigning the money "100" to the money key 104. It will be clear that any desired money amount data can be assigned to any of the preselected money keys 100, 102 or 104.

After completion of the above-mentioned preset operation, the registration mode key 28 is actuated to place the electronic cash register in the normal registration mode. When the registration mode key 28 is actuated, AND gates 70, 72 and 74 are made operative. When the preselected money key 100 is actuated in the normal registration mode, the numeral data "10" stored in a memory 40 is applied to the central processor unit 16 through the AND gate 70. When the preselected money key 102 is actuated in the normal registration mode, the numeral data "50" stored in the memory 42 is applied to the central processor unit 16 through the AND gate 72. Further, when the preselected money key 104 is actuated in the normal registration mode, the numeral data "100" stored in the memory 44 is applied to the central processor unit 16 through the AND gate 74.

When it is desired to introduce the money data "300" into the electronic cash register, the numeral key "3" included in the numeral keys 10 is first actuated and, then, the preselected money key 104 is actuated. The central processor unit 16 receives the two numeral data "3" and "100" and functions to perform the calculation "3×100" to obtain the numeral data "300".

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register comprising:
   input means for introducing transaction data into said cash register;
   processor means responsive to said input means for conducting arithmetic calculations on said introduced transaction data;
   transaction memory means responsive to said processor means for storing the results of said arithemetic calculations;
   at least one variable money amount entry key means for allowing an operator to select preset numerical amount information;
   means for selecting between a preset mode and a normal registration mode; and
   preset means for presetting the numerical amount information of said variable money amount key means when said register is in said preset mode, said preset means including,
   means for selecting between a preset mode and a normal registration mode; and
   preset means for presetting the numerical amount information of,
   said variable money amount key means when said register is in said preset mode; said preset means including,
      amount memory means for storing the numerical amount information of said variable money amount key means,
      means for introducing said numerical amount information into said memory when said cash register is in said preset mode, and
      means responsive to actuation of said variable money amount key means when said cash register is in said normal registration mode for transferring said numerical amount information stored in said amount memory means to said processor means.

2. The cash register of claim 1 wherein said amount memory means may store a multiple digit amount therein, said multiple digit amount being introduced into said processor means by a single calculation of said variable money amount key means.

3. The cash register of claim 1 wherein said means for transferring comprises first AND gate means responsive to selection of said normal registration operation mode with said means for selecting, and actuation of said variable amount key means, for enabling transfer of the contents of said amount memory means to said processor means.

4. The cash register of claim 3 wherein said means for introducing comprises second AND gate means responsive to selection of said preset mode by said mode selection means and to actuation of said variable money amount key means, for passing data introduced via said input means to said amount memory means for storage therein.

5. The cash register of claim 4 further comprising buffer means for buffering the transfer of data from said input means to said amount memory means via said second AND gate means.

6. The cash register of claim 1 wherein a preset means is provided for each said variable money amount key means.

7. The cash register of claim 2 wherein a preset means is provided for each said variable money amount key means.

8. The cash register of claim 3 wherein a preset means is provided for each said variable money amount key means.

9. The cash register of claim 4 wherein a preset means is provided for each said variable money amount key means.

10. The cash register of claim 5 wherein a preset means is provided for each said variable money amount key means.

* * * * *